(12) United States Patent
Shearer et al.

(10) Patent No.: US 8,396,729 B2
(45) Date of Patent: Mar. 12, 2013

(54) KAIZEN NEWSPAPER

(75) Inventors: Scott C. Shearer, Merritt Island, FL (US); John Nicholas Proferes, Cocoa Beach, FL (US); Mitchell D. Baker, Sr., Titusville, FL (US); Kenneth B. Reilly, Palm Bay, FL (US); Vijai K. Tiwari, Orlando, FL (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 12/256,248

(22) Filed: Oct. 22, 2008

(65) Prior Publication Data

US 2010/0106549 A1 Apr. 29, 2010

(51) Int. Cl.
*G06Q 40/00* (2012.01)
(52) U.S. Cl. .................... 705/7.11; 705/7.42
(58) Field of Classification Search ............. 705/7, 7.11, 705/7.42
See application file for complete search history.

(56) References Cited

U.S. PATENT DOCUMENTS

| | | | | |
|---|---|---|---|---|
| 6,651,061 B2 * | 11/2003 | Hara et al. | ............................. | 1/1 |
| 7,006,878 B2 * | 2/2006 | Schweizerhof et al. | ........ | 700/51 |
| 7,035,809 B2 * | 4/2006 | Miller et al. | ................. | 705/7.23 |
| 7,525,545 B2 * | 4/2009 | Brauss | .......................... | 345/440 |
| 7,609,637 B2 * | 10/2009 | Doshi et al. | .................... | 370/235 |
| 7,693,781 B2 * | 4/2010 | Asher et al. | ..................... | 705/37 |
| 7,711,628 B2 * | 5/2010 | Davie et al. | ..................... | 705/37 |
| 2004/0162745 A1 * | 8/2004 | Rodrigue et al. | ................. | 705/7 |
| 2005/0063384 A1 * | 3/2005 | De Jaegher et al. | .......... | 370/389 |
| 2005/0065805 A1 * | 3/2005 | Moharram | ........................ | 705/1 |
| 2005/0177260 A1 * | 8/2005 | Schweizerhof et al. | ........ | 700/97 |
| 2005/0234766 A1 | 10/2005 | Shuker | | |
| 2006/0184416 A1 * | 8/2006 | Nag | ............................... | 705/11 |
| 2006/0224441 A1 * | 10/2006 | Kerkar et al. | ................... | 705/11 |
| 2006/0242005 A1 * | 10/2006 | Rodrigue et al. | ............... | 705/11 |
| 2007/0233537 A1 * | 10/2007 | Ficalora et al. | .................... | 705/7 |
| 2008/0140490 A1 * | 6/2008 | Wang et al. | ........................ | 705/8 |
| 2009/0099887 A1 * | 4/2009 | Sklar et al. | ........................ | 705/7 |
| 2010/0070348 A1 * | 3/2010 | Nag | ............................... | 705/11 |
| 2010/0106549 A1 * | 4/2010 | Shearer et al. | ..................... | 705/9 |
| 2010/0145755 A1 * | 6/2010 | Narkilahti | ........................ | 705/8 |

* cited by examiner

*Primary Examiner* — Thomas Dixon
*Assistant Examiner* — Benjamin S Fields
(74) *Attorney, Agent, or Firm* — Toler Law Group

(57) ABSTRACT

Systems, computer program products, and methods are disclosed for tracking an improvement event. An embodiment includes an event interface configured to receive a plurality of entries related to each of a plurality of improvement events. The plurality of entries includes a project identifier for the improvement event, a creation date, an objective, an action related to reaching the objective, and a first deadline related to the improvement event. A database interface is configured to store the plurality of entries in an event database.

16 Claims, 14 Drawing Sheets

FIG. 3

EVENT.XLS
File Edit View Insert Format Tools Data Window Help

| | A 312 | B 314 | C 316 | D 318 | E 320 | F 322 | G 324 |
|---|---|---|---|---|---|---|---|
| 1 | Identifier | POC | Create Date | Objective | Action | Deadline | % Complete |
| 2 | Project A | John Doe | 1/1/2008 | | + Efficiency | 1/1/2009 | 50% |
| 3 | | | | | | | |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |

Event    Attachments

EVENT.XLS
File Edit View Insert Format Tools Data Window Help

| | A | B | C | D | E | F | G |
|---|---|---|---|---|---|---|---|
| 1 | Identifier | POC | Create Date | Object | Action | Deadline | % Complete |
| 2 | Project A | John Doe | 1/1/2008 | | + Efficiency | 1/1/2009 | 50% |

DATA VALIDATION ERROR:

Please enter a description of the object of the improvement event

STATUS.XLS  Date: 9/1/2008

| | A | B | C | D | E | F | G |
|---|---|---|---|---|---|---|---|
| | Identifier | POC | Create Date | Object | Action | Deadline | % Complete |
| | Project A | John Doe | 1/1/2008 | Waste | + Efficiency | 1/1/2009 | 50% |
| | Project B | Jane Smith | 1/1/2008 | Mistakes | + Care | 6/1/2008 | 0% |
| | Project C | Jane Smith | 1/1/2008 | Injuries | + Safety | 12/1/2008 | 90% |

FIG. 8

STATUS.XLS  Date: 9/1/2008

| | A | B | C | D | E | F | G |
|---|---|---|---|---|---|---|---|
| | Identifier | POC | Create Date | Object | Action | Deadline | % Complete |
| | Project A | John Doe | 1/1/2008 | Waste | + Efficiency | 1/1/2009 | 70% |
| | Project B | Jane Smith | 1/1/2008 | Mistakes | + Care | 6/1/2008 | 0% |
| | Project C | Jane Smith | 1/1/2008 | Injuries | + Safety | 12/1/2008 | 90% |

FIG. 10

STATUS.XLS  Date: 9/1/2008

Status

| | A | B | C | D | E | F | G |
|---|---|---|---|---|---|---|---|
| | Event/Area | POC | Create Date | Problem | Action | Deadline | % Complete |
| | Project A | John Doe | 1/1/2008 | Waste | + Efficiency | 1/1/2009 | 70% |
| | Project B | Jane Smith | 1/1/2008 | Mistakes | + Care | 6/1/2008 | 0% |
| | Project C | Jane Smith | 1/1/2008 | Injuries | + Safety | 12/1/2008 | 90% |

STATUS.XLS    Date: 9/1/2008

| | A | B | C | D | E | F | G |
|---|---|---|---|---|---|---|---|
| Status | Event/Area | POC | Create Date | Problem | Action | Deadline | % Complete |
| | Project C | Jane Smith | 1/1/2008 | Injuries | + Safety | 12/1/2008 | 90% |
| | Project A | John Doe | 1/1/2008 | Waste | + Efficiency | 1/1/2009 | 70% |
| | Project B | Jane Smith | 1/1/2008 | Mistakes | + Care | 6/1/2008 | 0% |

FIG. 12

EVENT.XLS

1200

| | A | B | C | D | E | F | G |
|---|---|---|---|---|---|---|---|
| Event | Event/Area | POC | Create Date | Problem | Action | Deadline | % Complete |
| | Project A | John Doe | 1/1/2008 | Waste | Efficiency | 1/1/2009 | 50% |

Attachments

Enter password to access Project A Event Report

1210

KAIZEN NEWSPAPER

NOTICE OF GOVERNMENT RIGHTS

The invention described herein was made in the performance of work under NASA Contract No. NAS 10-02007 and is subject to the provisions of Section 305 of the National Aeronautics and Space Act of 1958 (72 Stat. 435: 42 U.S.C. §2457).

FIELD OF THE DISCLOSURE

The present disclosure is generally related to managing improvement events or "Kaizen events."

BACKGROUND

Lean management techniques are directed at improving workplace efficiency. When a project that may improve efficiency is identified, lean management dictates that the project be documented. The measures identified by the project are regarded as improvement events, which commonly are termed "lean events" or "Kaizen events." The improvement events are documented in an improvement event report commonly known as a "Kaizen newspaper." In one implementation, the Kaizen newspaper is a single sheet of paper that records information about the improvement event, such as an identifier for the project, a date of the document, an objective of the project, one or more actions relating to achieving the objective, and one or more deadlines for completion of the project. Referencing the Kaizen newspaper, management can track the progress of the project.

Creation of a Kaizen newspaper to document the identification of an improvement event is a separate matter from following through to determine that the identified improvement is made. When a number of improvement events are recorded, tracking all of the improvement events and their respective Kaizen newspapers may present a challenge. After the improvement event is documented, enthusiasm for the project may wane over time, and completion of the project may become subordinate to new projects or other concerns. Potentially valuable improvement events may be forgotten or continually deferred in the face of other tasks.

SUMMARY

Embodiments disclosed herein include systems, computer program products, and methods for tracking and managing improvement events. Instead of documenting improvement events on paper, and then attempting to track and manage the project documents, improvement events are recorded using an electronic improvement event interface, such as a spreadsheet document. The improvement event interface includes fields to receive a plurality of entries to manifest relevant information about the improvement event. In one embodiment, the improvement event interface includes a plurality of structured query language (SQL) statements used to extract the plurality of entries from the improvement event interface and to store the plurality of entries in an event database. A status interface, such as another spreadsheet document, is configured to extract the plurality of entries for each of a plurality of improvement events logged in the event database. Information about the plurality of improvement events is collected in a single status interface that can be sorted according to various improvement event attributes. Visual indicators may be assigned to identify improvement events that, for example, are on schedule or are behind schedule. In short, multiple improvement events can be collectively tracked through electronic interfaces to better manage the improvement events.

In one illustrative embodiment, an improvement event interface is configured to receive a plurality of entries related to each of a plurality of improvement events. The plurality of entries includes a project identifier for the improvement event, a creation date, an objective, an action related to reaching the objective, and a first deadline related to the improvement event. A database interface is configured to store the plurality of entries in an event database.

In another illustrative embodiment, a computer program product is provided for presenting a status of a plurality of improvement events maintained in an event database. The computer program product includes a computer-readable storage medium embodying computer-executable program instructions. The computer-executable program instructions include first program instructions to access an event database. The event database maintains a plurality of entries associated with each of a plurality of improvement events. The computer-executable program instructions include second program instructions to retrieve one or more of the plurality of entries associated with one or more of the plurality of improvement events from the event database for inclusion in a status interface.

In another illustrative embodiment, a method receives a request from a requester to open an improvement event report for an improvement event. A determination is made as to whether the improvement event report should be opened for the improvement event. Upon the determination being made that the improvement event report should be opened, the opening of the improvement event report is logged. An improvement event report is sent to the requester to be completed by the requester and the improvement event report is tracked.

The features, functions, and advantages that have been discussed can be achieved independently in various embodiments or may be combined in yet other embodiments, further details of which are disclosed with reference to the following description and drawings.

BRIEF DESCRIPTION OF THE DRAWINGS

FIGS. 3-6 depict an improvement event interface used by the improvement event tracking system of FIG. 1 in collecting information about improvement events;

FIGS. 7-12 depict a status interface used by the improvement event tracking system of FIG. 1 in tracking and managing improvement events;

DETAILED DESCRIPTION

In accordance with particular illustrative embodiments, entries that describe in an improvement event are received via an electronic improvement event interface, such as a spreadsheet document. The electronic improvement event interface is configured to store the received entries in an event database from which the entries can be retrieved and manipulated in order to track the improvement event.

Figure 1:
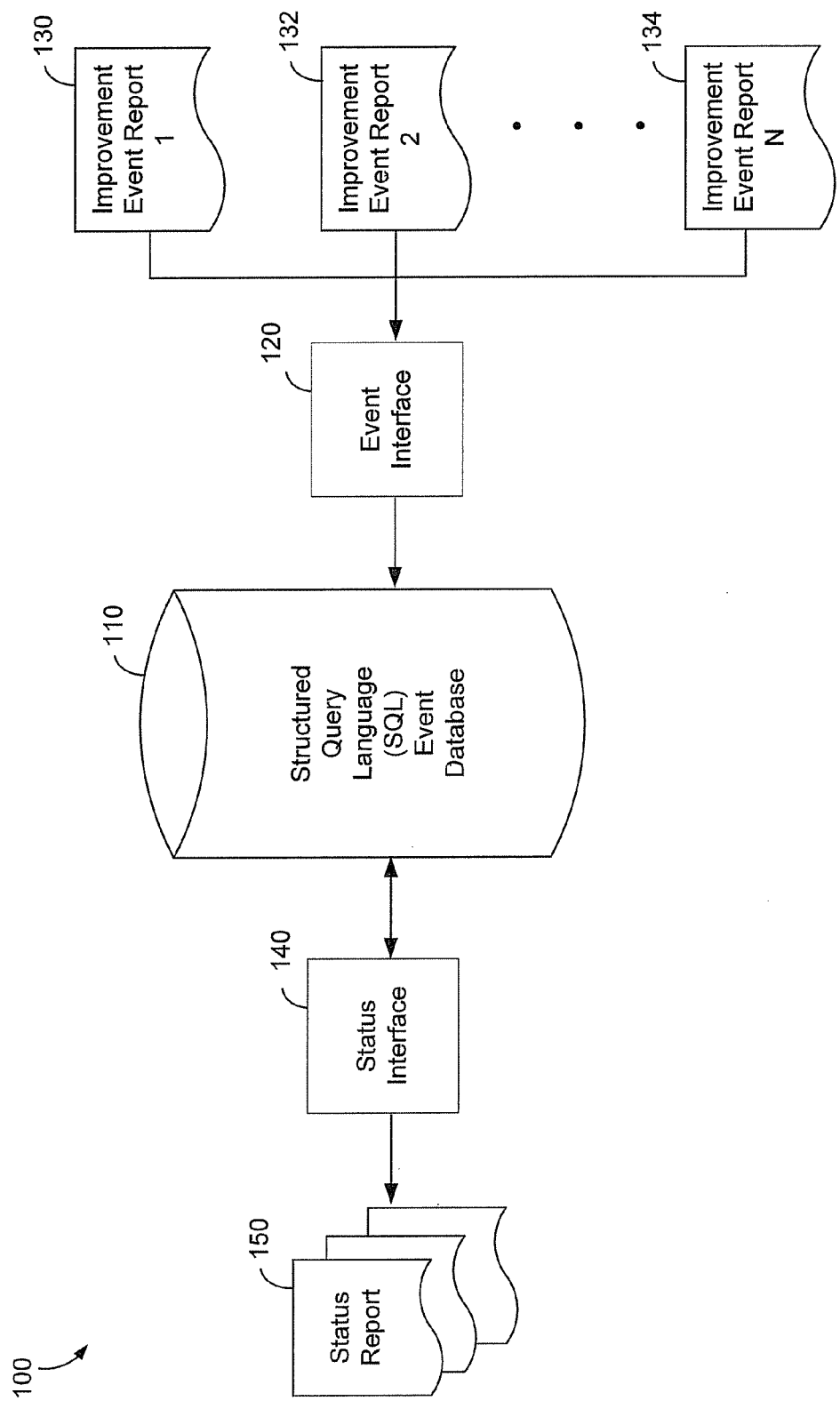
FIG. 1 is a block diagram of a particular illustrative embodiment of an improvement event tracking system.

FIG. 1 is a block diagram depicting a particular illustrative embodiment of a system, generally designated 100, for receiving, tracking, and managing improvement events. The system 100 includes an event database 110 that maintains a plurality of entries for each of a plurality of improvement events being tracked by the system 100. In one embodiment, the event database 110 is a structured query language (SQL) database. The entries for each of the plurality of improvement events are entered into the event database 110 using an event interface 120. In one illustrative embodiment, the event interface includes a spreadsheet program. The spreadsheet program enables SQL statements to be embedded in documents to facilitate transfer of data from the spreadsheet document to be stored into the SQL database. The SQL statements may be embedded in an improvement event report template that is used to create a plurality of improvement event reports, such as a first improvement event report 130, a second improvement event report 132, through an N-th improvement event report 134, as are described in FIG. 1 and as described in further detail with reference to FIGS. 3-6.

With the plurality of entries of the plurality of improvement events being stored in the SQL database 110, information on each of the improvement events may be extracted from the SQL database 110 to monitor and manage the improvement events using SQL statements. In one illustrative embodiment, a status interface 140 presents the SQL statements to the SQL database 110 to extract improvement event data for analysis. In one particular illustrative embodiment, the status interface 140 may also include a spreadsheet including a plurality of SQL statements configured to extract data from the SQL database 110 in order to generate one or more status reports 150 that summarize information related to the plurality of improvement event reports 130-134. As a result, instead of managing a plurality of improvement events by attempting to manage each of the plurality of improvement event reports 130-134, the events instead may be managed using one or more status reports 150. As a result, many improvement event reports that conventionally may have been presented as many, separate event reports may be reduced into a single status report, greatly simplifying the management of the improvement events.

Figure 2:
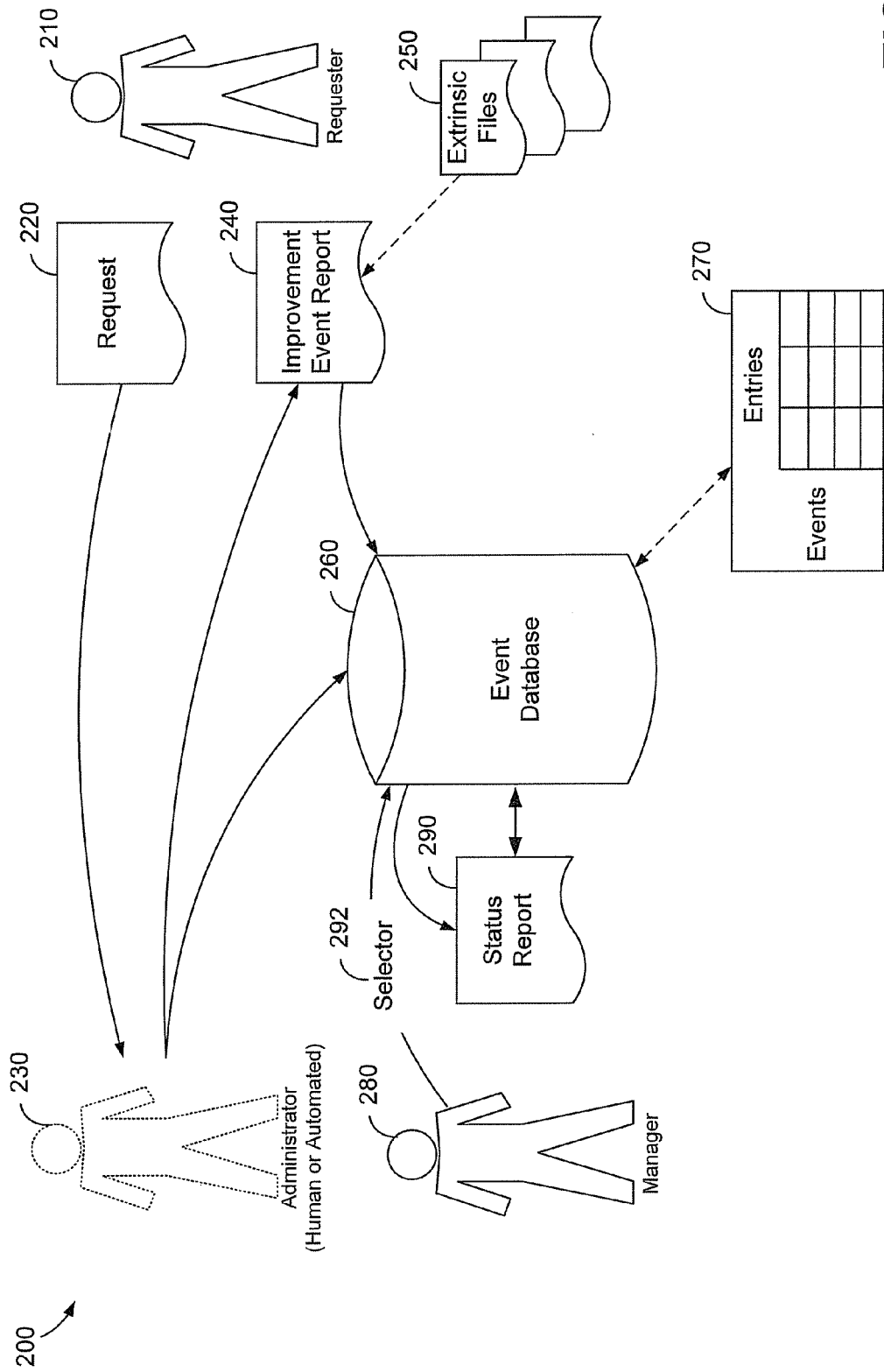
FIG. 2 is a block diagram depicting operation of an embodiment of the improvement event tracking system of FIG. 1.

FIG. 2 is a block diagram 200 depicting an example of the operation of the system 100 of FIG. 1. A requester 210 initiates the operation of the system 100. The requester 210 may be a manager or a team leader representing a group or a team or the requester 210 may be a member of such a team. Upon an improvement event being identified, the requester 210 sends a request 220 to an improvement event administrator 230 to open an event report. In one particular illustrative embodiment, the request may be in the form of a request e-mail sent to the improvement event administrator 230. Alternatively, the request 220 may in the form of another form of written, verbal, or electronic communication. The improvement event administrator 230 may be a human administrator or the improvement event administrator 230 may be an automated operator, as indicated by the outline of the improvement event administrator 230 being rendered as a dotted line. The improvement event administrator determines whether an improvement event report should be opened for the improvement event reported in the improvement event request 220. In the case of the human improvement event administrator 230, the improvement event administrator 230 may substantively review the request 220 to determine whether an improvement event report should be opened for the improvement event. The improvement event administrator 230 may determine whether a similar improvement event already has been identified any may consider other factors in determining whether an event report should be opened.

Alternatively, a human improvement event administrator 230 or an automated event report administrator 230—which may include, for example, an automated administrator that responds to e-mail requests—may automatically open an improvement event report for every request 220. Even if an improvement event report is opened for every request 220 received, an advantage of illustrative embodiments is that every request 220 may be logged in the event database 260, such that, from the outset, every reported improvement event is tracked by the system.

In any case, when the improvement event administrator 230 determines that an improvement event report should be opened for the request 220, an improvement event report 240 is issued to the requester 210. The requester 210 is responsible for completing the improvement event report 240 as further described with reference to FIG. 3. As described with reference to FIG. 3, the requester 210 is responsible for completing the improvement event report 240 by submitting a plurality of entries describing the improvement event. In completing the improvement event report 240, as further described with reference to FIG. 6, the requester 210 may attach or otherwise submit a plurality of extrinsic files 250. An improvement event report 240 may be in the form of a spreadsheet document following an established spreadsheet template that is configured to transfer the plurality of entries into the event database 260. However, if there are other types of electronic documents, such as scanned images, photographs, or other documents that are relevant to the improvement event, the extrinsic files 250 may be attached to and associated with the improvement event report 240. The extrinsic files 250 are linked to the improvement event report 240 so that they are accessible by persons involved in managing the improvement event.

Once the improvement event report 240 is completed, the entries describing the improvement event are transferred into the event database 260. The plurality of entries included in the improvement event report 240 are stored in a respective portion of the event database in association with the improvement event documented in the improvement event report 240. In the case of an SQL event database 260 as previously described with reference to FIG. 1, a plurality of entries for each improvement event are stored in a relational data structure 270. A relational data structure 270 includes a logical, tabular form. Using the relational data structure 270, the plurality of entries for each of the improvement events are associated with the improvement event. Also, the relational data structure 270 associates similar types of entries with each other in respective portions of the event database. For example, as shown in FIG. 2, all of the entries associated with a particular improvement event are included in the same row of the relational data structure 270, while all of the project identifiers, deadlines, or other entry types are included in the same column of the relational data structure 270. The improvement event report 240 may includes an electronic spreadsheet file. The improvement event report 240 may include SQL statements that cause the entries in the improvement event report 240 to be automatically transferred into the event database 260.

Using a status interface, some or all of the plurality of entries or some or all of the plurality of improvement events in the event database 260 may be extracted by a manager 280 into a status report 290. The status report 290 may be used by the manager 280 or by another person to track the improvement events logged into the event database 260.

In one particular embodiment, the manager 280 may have access to a selector 292 that enables the manager 280 to select which of the plurality of entries or which of the plurality of improvement events will be included in the status report 290 based on one or more specified attributes. For example, the manager 280 may use the selector 292 to retrieve only improvement events that have a specified attribute, such as by including a specified term in a project identifier or by having a certain minimum completion percentages, for inclusion in the status report 290. Alternatively, the manager 280 may use the selector 292 to extract information only for improvement event reports created prior to or after a specified date. Being able to select improvement event reports created prior to or after a specified date enables the manager 280 to choose to review older improvement event reports or newer improvement events, respectively, to monitor the progress of each group of improvement event reports.

As further described below, particular illustrative embodiments of the status report 290 may be manipulated to assign visual indicators to improvement reports. For example, a visual indicator may be associated with improvement event reports that have reached a particular completion percentage or associated with improvement event reports for which deadlines are imminent or have passed. Alternatively, the status report 290 may enable improvement events to be sorted according to various entries associated with each of the improvement reports. For example, the improvement reports listed in the status report may be listed in order of percentage completed or in order of deadline date. Also, the status report may enable calculations to be performed, for example, to determine a relative nearness to a deadline each of the improvement events may be.

FIG. 3 depicts an improvement event interface 300 that may be used receive a plurality of entries describing an improvement event documented by a requester 210 (FIG. 2). The improvement event interface 300 is in the form of a spreadsheet document. Along a first dimension of the spreadsheet, a plurality of columns 310 identifies the plurality of entries to be entered to describe the improvement event. For example, the columns 310 specify a plurality of entries including a project identifier 312, a point of contact 314, a creation date 316, an objective 318, an action related to reaching the objective 320, a deadline related to the project 322, and a portion of the project completed 324. The improvement event interface 300 may include additional or fewer columns 310 or fields. In addition, the fields may be arranged as a plurality of rows, rather than as a plurality of columns. The requester completes the improvement event report by entering the requested information in a series of fields 330 associated with each of the columns 310.

According to a particular illustrative embodiment, the improvement event interface is configured to perform data validation on data as it is entered. For example, as shown in FIG. 4, if a requester fails to provide one of the entries, the improvement event interface 400 may generate an error message 410 and refuse to accept the data entered into the improvement event interface 400. For example, as shown in FIG. 3, the requester may have failed to specify an objective in the objective column 318. Upon attempting to submit an improvement event report via the improvement event interface 400, the event improvement report was refused and the error message 410 informed the requester that the requester failed to provide all of the requested entries. In addition, data validation may evaluate the submitted entries to determine that the entries provide an appropriate type of information.

For example, the improvement event interface 400 may determine that date information is entered in the creation and deadline fields, etc.

Figure 5:
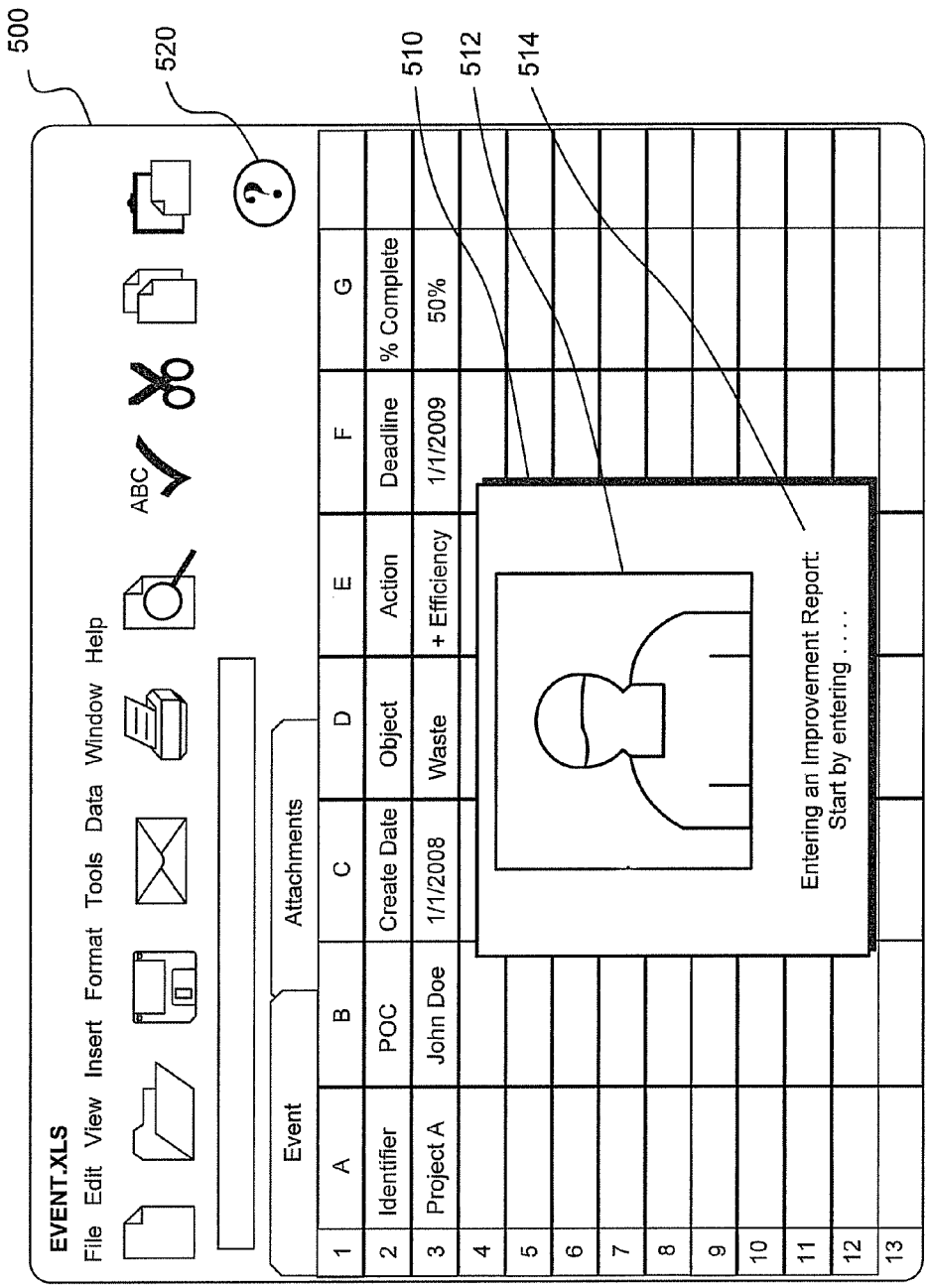

According to other illustrative embodiments, the event improvement interface is configured to provide online help or tutorial information to assist the user. FIG. 5 depicts an improvement event interface 500 in which the requester has invoked a tutorial screen 510. The requester may have invoked the tutorial screen 510 by selecting a help icon 520, by pressing a designated tutorial keystroke, invoking help from a pull-down menu, etc. The tutorial screen 510 may include help in the form of one or more image or video presentations 512 that may show the requester how to use the improvement event interface 500. The tutorial screen 510, instead of the image or video presentations 512, may include textual help information 514 (which may include, for example, closed captioned text in a same language or a different language as audio content, which may also be presented by the tutorial screen 510). The tutorial screen 510 may inform the requester what information is to be submitted, what the format of the information should be, how to submit the information, or provide any other form of instruction.

Figure 6:
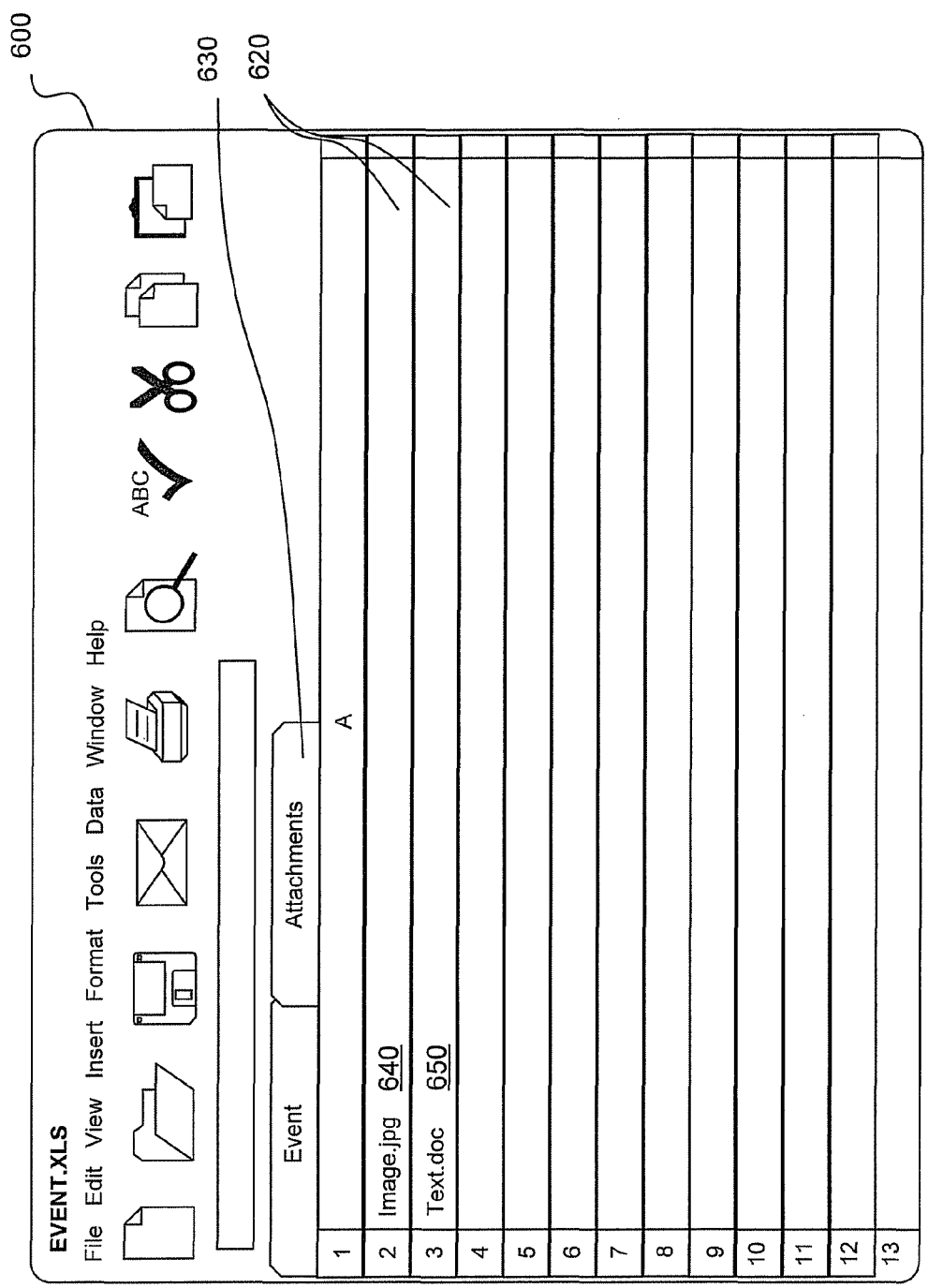

FIG. 6 depicts an attachment screen 600 that a requester may use to associate extrinsic documents with the improvement event report 240 as described with reference to FIG. 2. For example, a problem, such as an inefficiently-organized work space, may be documented in a photograph or other image of the work space. Alternatively, the requester may be submitting the improvement event in response to a written report describing a work flow problem or in response to another type of document. Whether the document is an image file, a text file, a database file, another spreadsheet file, or any other type of file, the attachment screen 600 may be used to attach or otherwise associate the document with the improvement event report being created using the improvement event interface.

The attachment screen 600 includes an attachment list 620 in which a number of documents may be associated with the improvement event report. The attachment list 620, in one particular illustrative embodiment, may be accessed by selecting an attachments tab 630. The requester may add documents to the attachment list 620 by typing file names, dragging the files to a window where the improvement event report is presented, or by any number of other ways of identifying a document to be attached to the improvement event report. In the example of FIG. 6, the requester has associated two documents with the improvement event report, the documents including a photograph, image.jpg 640 and a text document, text.doc 650. Using the attachment screen 600, entries describing an improvement event be collected and logged in a database and related documentation can also be stored in association with the improvement event log.

It should be noted that the documents associated with the improvement event report via the attachment screen 600 may not actually be stored in the event database. The attached documents, such as image.jpg 640 or text.doc 650, may reside in other data stores or in other storage devices from the event database. A resource locator identifying a location from which the attached documents may be accessed may be stored in the event database, thereby enabling persons accessing the improvement event report to access the attached documents.

When the event database includes a plurality of entries for one or more of a plurality of improvement event reports, a status interface may be used to track, review, and manage the improvement event reports. FIG. 7 depicts a status interface 700 presenting the plurality of entries for each of a plurality of improvement events 710-730 documented in the event database. Using the status interface 700, which in the example of FIG. 7 includes another spreadsheet document, a manager or other user is able to review a summary of multiple improvement events, side-by-side, in a single report. In other words, instead of improvement events being documented in separate paper Kaizen newspapers, the status interface 700 may be used to retrieve a summary of the information for a plurality of improvement events. Using the status interface 700, at a glance, a manager or another use can view how many improvement events have been reported and may view information included in the plurality of entries submitted in documenting the improvement events in the improvement event reports submitted by the requesters.

Moreover, because the status interface 700 retrieves information from the event database, when the event database is updated, the information in the status interface is also updated. For example, note that, in the status interface 700 of FIG. 7, the "% Complete" 740 for the project with the identifier Project A 710 is listed as 50% complete 740 in the status interface 700. However, assume that the requester of Project A 710 updates the improvement event report to indicate that Project A 710 is 70% complete. FIG. 8 illustrates an updated status interface 800. Based on the update to the improvement event report, the status interface 800 shows that the "% Complete" 840 for Project A 810 is 70%. Thus, the status interface 800 collects and summarizes information for a plurality of improvement events, and the status interface 800 is dynamic in that it reports current information from the event database.

Figure 9:
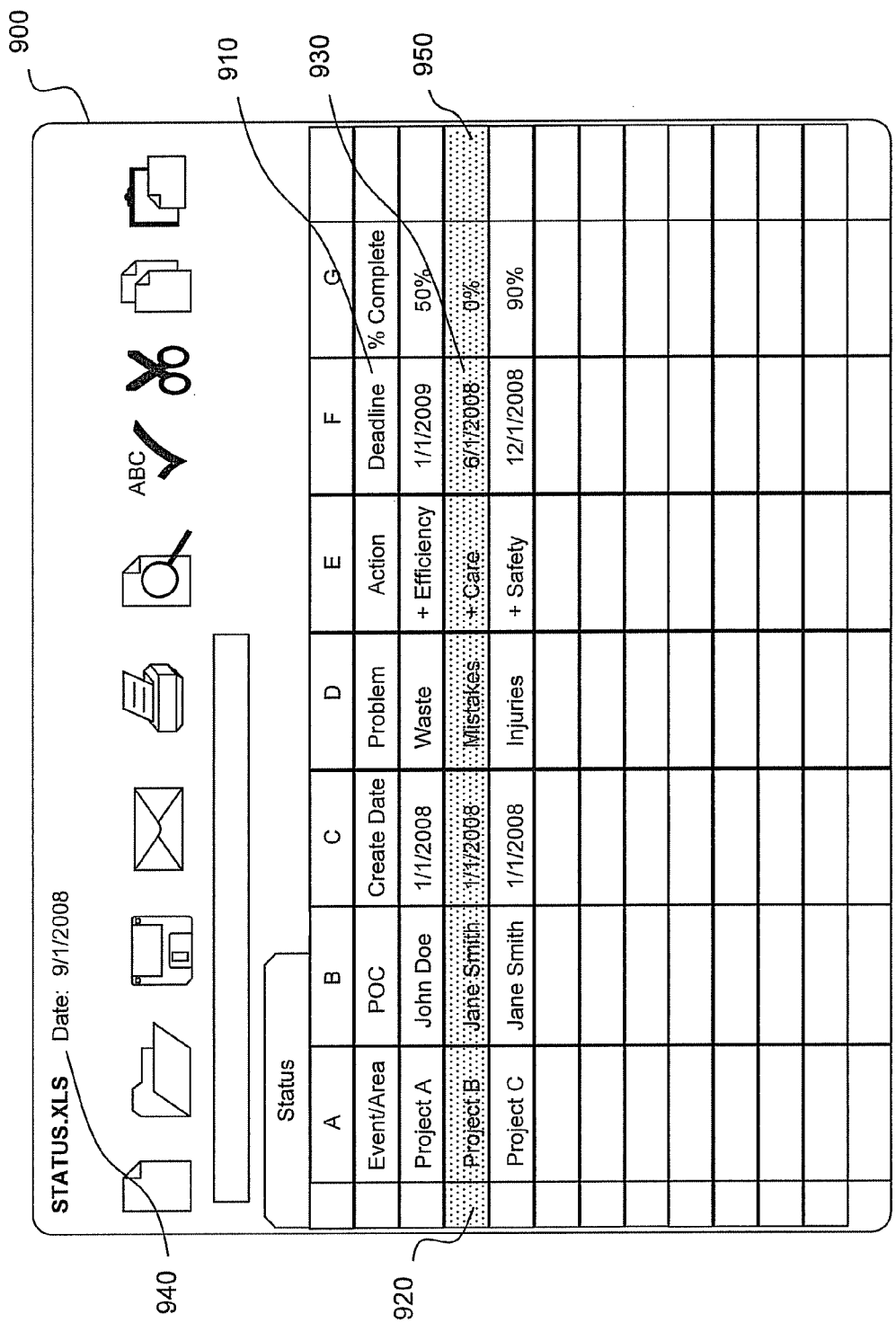

In addition to reporting and updating improvement event information, particular illustrative embodiments of the status interface enable visual indicators to be applied to improvement events and enables sorting of the improvement events to highlight particular improvement reports. For example, FIG. 9 depicts a status interface 900 in a project that is indicated to be continuing beyond a deadline 910 associated with the project. Specifically, the project with the identifier Project B 920 is associated with a Jun. 1, 2008 deadline 940, which is beyond the status date 940 of Sep. 1, 2008 associated with the status interface 900. As a result, the status interface 900 may automatically associate a visual indicator 950 (in this example, in the form of dot-shading) with Project B 920 to indicate that completion of Project B 920 has extended beyond its projected deadline 930 of Jun. 1, 2008. At a glance, a manager or other user can see which projects, if any, are overdue.

Similarly, visual indicators may be assigned for other reasons. For example, all projects having reached or not having reached a particular completion percentage may be flagged with a symbol, color, or shading to indicate the relative completeness of the projects. Also, symbols, colors, or shading may be associated with projects based on their creation dates, based on the point of contact, or based on attributes associated with the plurality of entries used to describe the various improvement events being monitored. In addition, the status interface 900 may enable a manager or other reviewer to manually associate one or more visual indicators with a particular project to highlight that project for a selected reason.

In addition to visual indicators, illustrative embodiments of the status interface permit manual or automatic sorting of improvement events based on one of the plurality of entries associated with the improvement events. For example, FIG. 10 depicts a status interface 1000 that the manager or other reviewer desires to sort to present the improvement events in a different order based on one or more of the plurality of entries associated with the improvement events 1010-1030 reported in the status interface 1000. For example, the reviewer may desire to sort the improvement events in order of which of the improvement events 1010-1030 is most (or least) complete. The status interface 1000 shows that Project A 1010 is 70% complete, Project B 1020 is 0% complete, and Project C 1030 is 90% complete. By manipulating a cursor 1040 to select a % Complete header 1050, or engaging another input, the status interface 1000 reports the improvement events in order of descending completion percentage. FIG. 11 illustrates a re-sorted status interface 1100 illustrating that Project C 1130, at 90% complete, is now listed first, followed by Project A 1110 and Project B 1120 in descending order of completeness.

In addition to reviewing the status interface for a number of improvement events, a manager or other user also may desire to access a particular improvement event report to edit, update, or otherwise work with a particular improvement event report. A particular illustrative embodiment enables a manager or other user to access a particular improvement event report by selecting the improvement event report from the status interface. For example, as shown in FIG. 11, a manager or other user manipulates a cursor 1140 to select a project identifier 1150 for Project A 1110 to access the improvement event report.

Although illustrative embodiments of the status interface enable access to improvement event reports from a status interface, improvement event reports or status interfaces may be secured by password protection or other security measures. As previously noted, the manager or user attempted to access the improvement event report for Project B, but FIG. 12 shows that access to the improvement event report is password protected. Thus, upon the manager or other user selecting the identifier 1150 for Project B 1120 in FIG. 11, FIG. 12 shows a status interface 1200 presenting a password window 1210 seeking the password for the improvement event report for Project B before permitting access to the selected improvement report.

Figure 13:
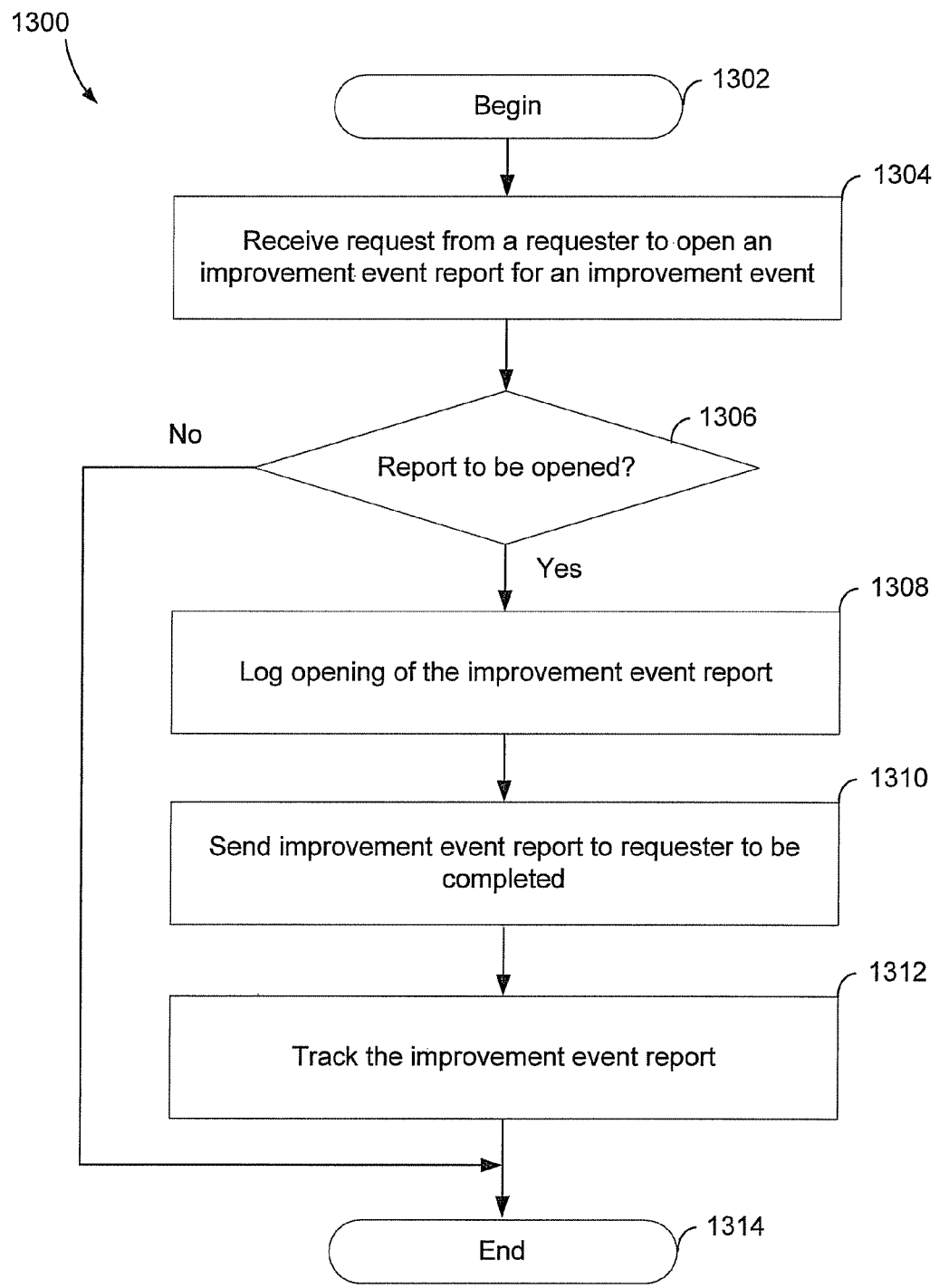
FIG. 13 is a flow diagram of a particular illustrative embodiment of a method for tracking improvement events.

FIG. 13 is a flow diagram 1300 of a particular illustrative embodiment of a method for tracking and logging improvement events. The method begins at 1302. A request is received from a requester to open an improvement event report for an improvement event at 1304. The method determines whether the improvement event report should be opened at 1306. As previously described with reference to FIG. 2, the improvement event may be analyzed by a human or automated administrator to determine whether the improvement event report should be opened, or the improvement event report may be opened automatically upon request. If the method determines, at 1306, not to open the improvement event report, the method ends, at 1314. On the other hand, if the method determines, at 1306, that an improvement event report should be opened, the opening of the improvement event report is logged, at 1308, and the improvement event report is sent to the requester to be completed, at 1310. The method tracks the improvement event report, at 1312. Tracking the improvement event report may include determining if the improvement event report has been completed and returned as well as tracking the improvement event through the use of the status interface as previously described. Once the improvement event report has been tracked, the method ends at 1314.

Figure 14:
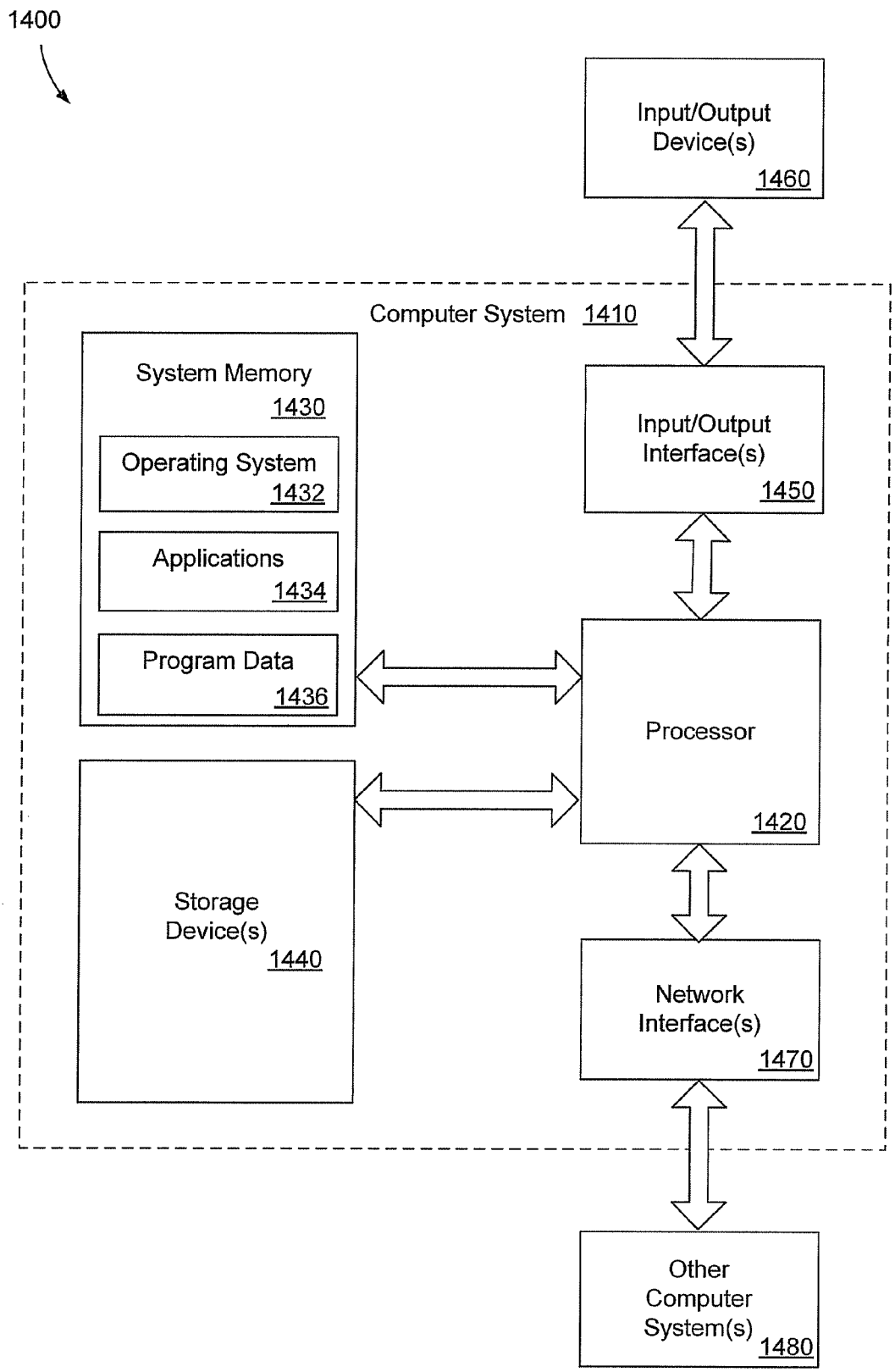
FIG. 14 is a block a block diagram of a general purpose computer system operable to implement embodiments of computer-implemented methods and computer-executable program instructions according to the present disclosure.

FIG. 14 is a block diagram of a computing environment 1400 including a general purpose computer system 1410 operable to support embodiments of computer-implemented methods and computer-executable program instructions according to the present disclosure. In one illustrative embodiment, one configuration, the computer system 1410 includes a workstation configured to access an event database over a network in order to request, create, or modify an event improvement report, or a workstation configured to access and to manipulate a status interface. The computer system 1410 typically includes at least one processor 1420. Within the computer system 1410, the processor 1420 communicates with a system memory 1430, one or more storage devices 1440, one or more input/output interfaces 1450, and one or more network interfaces 1470.

The system memory 1430 may include volatile memory devices, such as random access memory (RAM) devices and nonvolatile memory devices such as read-only memory (ROM), programmable read-only memory, and flash memory. The system memory 1430 typically includes an operating system 1432, which may include a basic/input output system for booting the computer system 1410 as well as a full operating system to enable the computer system 1410 to interact with users, other programs, and other devices. The system memory 1430 also typically includes one or more application programs 1434, such as a spreadsheet program as previously described. The system memory 1430 also may include program data 1436, such as a plurality of entries related to an improvement event report as previously described. The processor 1420 also communicates with one or more storage devices 1440 which, typically, include non-volatile storage devices such as magnetic disks, optical disks, or flash memory devices. The storage devices 1440 may include both removable and nonremovable memory devices. The storage devices 1440 typically are configured to store an operating system, applications, and program data.

The processor 1420 communicates with one or more input/output interfaces 1450 that enable the computer system 1410 to communicate with one or more input/output devices 1460 to facilitate user interaction. The input/output interfaces 1450 may include serial interfaces, such as universal serial bus (USB) interfaces or TREE 1394 interfaces, parallel interfaces, display adapters, audio adapters, and other interfaces. The input/output devices 1460 may include keyboards, pointing devices, displays, speakers, microphones, and other devices.

The processor 1420 also communicates with one or more network interfaces 1470 that enable the computer system 1410 to communicate with other computer systems 1480. The one or more network interfaces 1470 may include wired Ethernet interfaces, IEEE 802.01 wireless interfaces, Bluetooth communication interfaces, or other network interfaces. The other computer systems 1480 may include host computers, servers, workstations, and other computing devices.

Not all of the components or devices illustrated in FIG. 14 or otherwise described in the previous paragraphs are necessary to support implementations of the present disclosure. For example, a handheld device may include a single system memory 1430 comprised of a flash memory configured to store an operating system, one or more applications, and all program data. A compact device may or may not include removable storage 1450. In addition, the communication connection 1480 may include only a Bluetooth® radio transceiver and/or a Universal Serial Bus (USB) connection port for backup, update, and networking functions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A system, comprising:
    an event interface configured to:
        receive a plurality of entries related to an improvement event, wherein each of the plurality of entries includes:
            a project identifier;
            a creation date;
            an objective;
            an action related to reaching the objective; and
            a first deadline related to the improvement event; and
        present the plurality of entries in a spreadsheet, wherein each of the plurality of entries is maintained along a first dimension of the spreadsheet, and wherein the spreadsheet includes an attachment portion configured to associate an extrinsic file with a particular entry of the pluarilty of entries; and
    a database interface configured to store the plurality of entries at an event database.

2. The system of claim 1, wherein the plurality of entries are stored at the event database in association with each of a plurality of improvement events.

3. The system of claim 2, wherein the event database includes a structured query language (SQL) database configured to store the plurality of entries in association with each of the plurality of improvement events in a relational data structure.

4. The system of claim 3, wherein the spreadsheet is configured to validate data entered into the spreadsheet.

5. The system of claim 3, wherein the spreadsheet includes a plurality of embedded SQL statements configured to cause a first plurality of entries to be stored in a respective portion of the event database in association with a first improvement event.

6. The system of claim 1, wherein the event interface is configured to present a tutorial describing use of the event interface in response to a user request.

7. The system of claim 1, wherein access to the event interface is controlled by password protection.

8. A computer-readable medium comprising instructions, that when executed by a processor, cause the processor to:

access an event database maintaining a plurality of entries associated with each of a plurality of improvement events, wherein the plurality of entries for each of the plurality of improvement events are derived from improvement event reports submitted to document an improvement event;

retrieve one or more entries of the plurality of entries associated with one or more of the plurality of improvement events from the event database;

display the retrieved one or more entries in a spreadsheet, wherein the spreadsheet is configured to maintain each of the retrieved one or more entries along a first dimension of the spreadsheet, and wherein the spreadsheet includes an attachment portion configured to associate an extrinsic file with a particular entry of the retrieved one or more entries; and generate one or more reports based on the retrieved one or more entries, wherein each of the one or more reports identifies a percentage of completion of an objective associated with a corresponding improvement event.

9. The computer-readable medium of claim 8, further comprising instructions, that when executed by the processor, cause the processor to enable selection of data associated with one or more of the plurality of improvement events.

10. The computer-readable medium of claim 9, further comprising instructions, that when executed by the processor, cause the processor to receive the selection of the data associated with the one or more of the plurality of improvement events based on at least one specified attribute included in the plurality of entries.

11. The computer-readable medium of claim 8, further comprising instructions, that when executed by the processor, cause the processor to enable selection of a portion of the retrieved one or more entries.

12. The computer-readable medium of claim 8, further comprising at least one of:

instructions, that when executed by the processor, cause the processor to perform one or more calculations on one or more of the plurality of entries associated with one or more of the plurality of improvement events;

instructions, that when executed by the processor, cause the processor to dynamically update the spreadsheet in response to a change in one or more of the plurality of entries associated with one or more of the plurality of improvement events;

instructions, that when executed by the processor, cause the processor to assign a visual indicator to one or more of the plurality of improvement events; and instructions, that when executed by the processor, cause the processor to sort data associated with the plurality of improvement events to change an order in which the plurality of improvement events is presented.

13. The computer-readable medium of claim 8, wherein the event database includes a structured query language (SQL) database and wherein the instructions executable by the processor include a plurality of SQL statements configured to retrieve the one or more of the plurality of entries for each of the one or more of the plurality of improvement events.

14. A computer-implemented method, comprising:

receiving, at a computing system, a request from a requester to open an improvement event report for an improvement event;

in response to receiving the request from the requester to open the improvement event report, logging opening of the improvement event report;

sending, from the computing system, the improvement event report for the improvement event to the requester to be completed, wherein the improvement event report includes a spreadsheet configured to maintain a plurality of entries related to the improvement event along a first dimension of the spreadsheet, and wherein the spreadsheet includes an attachment portion configured to associate an extrinsic file with the improvement event; and tracking, via an event database that maintains entries associated with the improvement event, the improvement event report.

15. The computer-implemented method of claim 14, further comprising determining whether the improvement event report should be opened before logging the opening of the improvement event report.

16. The computer-implemented method of claim 15, wherein tracking the improvement event report includes accessing, via a status interface, the event database.

* * * * *